United States Patent
Katzen et al.

(10) Patent No.: US 7,262,259 B2
(45) Date of Patent: Aug. 28, 2007

(54) METHOD OF PREPARING A TREATED SUPPORT

(75) Inventors: Stanley J. Katzen, Baton Rouge, LA (US); Anthony N. Speca, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/702,717

(22) Filed: Feb. 6, 2007

(65) Prior Publication Data

US 2007/0142577 A1 Jun. 21, 2007

Related U.S. Application Data

(62) Division of application No. 11/222,639, filed on Sep. 9, 2005, now Pat. No. 7,192,901.

(60) Provisional application No. 60/622,670, filed on Oct. 27, 2004.

(51) Int. Cl.
*C08F 210/02* (2006.01)
*C08F 210/06* (2006.01)

(52) U.S. Cl. ............ 526/348; 526/113; 526/129; 526/104; 526/158; 502/204; 502/87; 502/103; 502/104; 502/113

(58) Field of Classification Search ............... 502/87, 502/103, 104, 113, 204; 526/113, 348, 129, 526/104, 158
See application file for complete search history.

(56) References Cited

U.S. PATENT DOCUMENTS

| | | | | |
|---|---|---|---|---|
| 3,780,011 A | * | 12/1973 | Pullukat | 526/96 |
| 4,184,979 A | * | 1/1980 | Kirch et al. | 502/170 |
| 4,260,706 A | * | 4/1981 | Rekers et al. | 526/100 |
| 4,262,102 A | * | 4/1981 | Hoff et al. | 502/242 |
| 4,294,724 A | * | 10/1981 | McDaniel | 502/158 |
| 4,728,703 A | * | 3/1988 | Konrad et al. | 526/105 |
| 2003/0232935 A1 | * | 12/2003 | Kendrick et al. | 526/60 |

FOREIGN PATENT DOCUMENTS

| | | | |
|---|---|---|---|
| EP | 0 882 740 A1 | * | 12/1998 |
| GB | 1 334 662 | * | 10/1973 |
| GB | 1 415 649 | * | 11/1975 |

* cited by examiner

*Primary Examiner*—Ling-Sui Choi
(74) *Attorney, Agent, or Firm*—Catherine L. Bell

(57) ABSTRACT

This invention relates to a method to polymerize olefins comprising contacting a solid aluminum or solid titanium compound with a supported catalyst compound, heating the solid aluminum or solid titanium compound to cause the solid compound to vaporize, optionally activating the support by oxidation, thereafter contacting the activated support with one or more olefin monomers.

23 Claims, No Drawings

METHOD OF PREPARING A TREATED SUPPORT

PRIORITY CLAIM

This application is a divisional of U.S. Ser. No. 11/222,639, filed Sep. 9, 2005, now U.S. Pat. No. 7,192,901, which claims priority to and the benefit of U.S. Provisional Patent Application No. 60/622,670, filed Oct. 27, 2004.

FIELD OF THE INVENTION

This invention relates to titanated and/or aluminated supports and methods to polymerize olefin using such supports.

BACKGROUND OF THE INVENTION

There is a need to polymerize olefins such as ethylene and propylene to satisfy the large market demand for various plastics. In the past, olefins have been polymerized by means of a catalyst containing chromium deposited onto a support which may be silica, alumina, zirconia or thoria. The synthesis of these catalysts in some cases comprises transferring the described support to a mixing tank to form an isopentane (iC5) slurry. Once the slurry is formed a titanium ester such as titanium isopropoxide, Ti(OPr)4, was added to the slurry. This process then requires drying the slurry to a free-flowing powder. In this dry form the mixture is then transferred to the fluid bed activator and activated in air at temperatures of 550° C. to 850° C. An analogous process is disclosed in U.S. Pat. No. 3,976,632 to Delap et al., and a similar process is disclosed in U.S. Pat. No. 3,996,163 to Crump et al. These methods are time consuming and costly. Accordingly, there is an incentive to investigate and bring to market cheaper and faster methods of catalyst preparation. Specifically, a need exists for a process that is simpler, faster and does not require the use of a titanium ester such as Ti(OPr)4. The claimed invention fills such a need by providing a simpler process for the production of titanated supports, as described herein.

According to C. E. Marsden in Plastics, Rubber and Composites Processing and Applications Vol. 21, No. 4, 193-200 (1994), the promotional effect of titanium on chromium catalysts for ethylene polymerization is to reduce polymer molecular weight (higher melt index) and broaden the molecular weight distribution. Additionally according to C. E. Marsden, the catalysts exhibit rapid start of polymerization (reduced induction time) and higher activity.

EP patent 0,314,385 assigned to Mobil Oil discloses the preparation of titanated chromium on silica catalysts useful for gas phase polymerization of ethylene. The combination of the catalyst is introduced with at least one organomagnesium compound, RMgR', either prior to feeding or within the polymerization vessel. The catalyst may be titanated using a number of titanium halides, alkyl titanium halides, alkyl titanium alkoxides, alkoxy titanium halides or titanium alkoxides.

EP patent 0,882,740 assigned to FINA discloses the titanation of chromium based catalysts under specific conditions. Alkyl titanium alkoxides or titanium alkoxides are added to the chromium containing catalysts while at a temperature of at least 300° C. in a fluidized bed under nitrogen.

U.S. Pat. No. 3,780,011 assigned to Chemplex discloses the modification of chromium on SiO2 catalyst by the addition of a titanium ester to a bed of fluidized catalyst held at a temperature of at least 300° C. The esters have the general formula RnTi(OR1)m, wherein n+m=4.

U.S. Pat. No. 4,016,343 assigned to Chemplex discloses titanation of silica prior to the addition of the chromium compound to the titanated support. The chromium compound is a tetravalent alkoxide and the titanated support is prepared using titanium esters of the general formula RnTi(OR1)m, wherein n+m=4, TiX4, TiO2, alkanolaminetitanates, and titanium acetylacetonate compounds. Titanation is accomplished by mixing the support and the titanium compound and heating at a temperature of about 150-1200° C.

U.S. Pat. No. 4,184,979 assigned to Chemplex discloses the preparation of catalyst by dry blending Chromium (acac)3 with a silica support. The mixture is then heated to a temperature of 230-540° C. The catalyst is titanated by adding the liquid titanium compound to a fluidized bed of the chromium catalyst or by passing vapors of the titanium compound through the fluidized bed of the chromium catalyst.

U.S. Pat. No. 4,368,303 to McDaniel discloses a catalyst produced by forming a silica hydrogel; drying said hydrogel to form a xerogel; anhydrously incorporating a titanium compound into said xerogel; wherein chromium is introduced by either coprecipitating same with said silica hydrogel, by combining a water-soluble chromium compound with said hydrogel, or adding anhydrous solution with said hydrogel, or adding anhydrous solution of a chromium compound soluble in non-aqueous solvents to said xerogel; and after said drying and after said chromium is introduced, activating the resulting dried, chromium-containing composition by means of an activation procedure which comprises treatment at an elevated temperature in an atmosphere containing oxygen. In this manner, McDaniel does not disclose the use of a solid titanium compound.

U.S. Pat. No. 4,384,987 to Hawley discloses a method for preparing a polymerization catalyst comprising the steps of contacting a material comprising silica-supported chromium oxide or a compound, oxidizable to chromium oxide with a solution of a permanganate compound; heating the thus contacted material in a reducing atmosphere at a temperature in the range of about 600° C. to about 1100° C.; and then heating the material in an oxygen-containing atmosphere at a temperature in the range of about 450° C. to about 1000° C. for at least about one-half hour. In this manner, Hawley does not disclose the use of a solid titanium compound.

U.S. Pat. No. 4,402,864 assigned to Phillips Petroleum discloses the use of titanium polymers for titanation. The polymers are prepared from Ti(OR)4 and water. The soluble titanium polymer, e.g., TiO2(O-iC3H7)6 is most conveniently added to a hydrocarbon slurry of the support.

U.S. Pat. No. 4,728,703 assigned to BASF discloses the preparation of a chromium on silica catalyst by combining a slurry of silica in an alkane with finely divided CrO3, then adding alcohol, then adding Ti(OR)4, then the mixture is dried, and then the mixture is heated as a fluidized bed first in nitrogen and then in air.

A process for the preparation of activated catalyst for the polymerization of olefins in the absence of a solvent was disclosed in U.S. Pat. No. 5,573,993 to Koch. Koch discloses a three stage process, which includes a preactivation stage of heating a mixture of a powdered chromium salt with a support to a temperature below the melting temperature of the chromium salt for a period of between 0.5 hours and 18 hours, and then heating the mixture to an activation temperature. This method takes about 23 hours to complete. In this manner, Koch does not disclose a process which includes the reaction of a solid titanium compound.

SUMMARY OF THE INVENTION

This invention relates to a method to prepare a supported catalyst composition comprising the steps of contacting a solid titanium or solid aluminum compound with a supported catalyst compound, and heating the combination. Additionally, the solid titanium or solid aluminum compound can be oxidized either while heating the solid titanium compound or solid aluminum and supported catalyst composition or after heating the solid titanium compound or solid aluminum and supported catalyst composition.

This invention relates to a method of preparing a supported catalyst comprising the steps of contacting a solid titanium compound or solid aluminum compound with a supported catalyst composition, preferably a chromium embedded support, and heating the combination to a temperature sufficient to cause at least 50 wt. % of the solid titanium or solid aluminum compound to vaporize.

This invention relates to a method to polymerize olefins comprising contacting a solid titanium compound with a support, heating the solid titanium compound to cause the solid titanium compound to sublime, and activating the support by oxidation, thereafter contacting the activated support with one or more olefin monomers.

This invention relates to a method to polymerize olefins comprising contacting a solid aluminum compound with a support, heating the solid aluminum compound to cause the solid aluminum compound to sublime, and activating the support by oxidation, thereafter contacting the activated support with one or more olefin monomers.

A more complete appreciation of the claimed invention and many of the attendant advantages thereof will be readily obtained as the invention becomes better understood by reference to the following detailed description when considered in connection with the accompanying formulas, tables and embodiments. Further, as is apparent from the foregoing general description and preferred embodiments, while forms of the invention have been illustrated and described, various modifications can be made without departing from the spirit and scope of the invention. Accordingly, it is not intended that the invention be limited to the specific embodiments described herein.

DETAILED DESCRIPTION

In an embodiment, this invention relates to a method of preparing a supported catalyst comprising the steps of contacting a solid titanium compound or solid aluminum compound with a supported catalyst compound and heating the combination to at least 150° C.

In an alternative embodiment, this invention relates to a method of preparing a supported catalyst comprising the steps of contacting a solid titanium compound or solid aluminum compound, preferably titanium acetylacetonate or aluminum acetylacetonate, with a supported catalyst compound, preferably a chromium embedded support, and heating the combination to a temperature sufficient to cause at least 50 wt. % of the solid titanium compound or solid aluminum compound to vaporize.

In another embodiment, this invention relates to a method to polymerize olefins comprising contacting a solid titanium compound with a support, heating the solid titanium compound to cause the solid titanium compound to sublime, and activating the support by oxidation, thereafter contacting the activated support with one or more olefin monomers. In an alternative embodiment the olefin monomer comprises ethylene. In still another embodiment the olefin monomer comprises propylene.

Solid Titanium or Solid Aluminum Compound

Preferably the solid titanium compound is in particulate form. Particle sizes of the solid titanium compound can range from about 1-10,000 µm, preferably from about 1-500 µm, more preferably the particle sizes range from about 1-250 µm, and even more preferably the particle sizes range from about 1-100 nm. In another embodiment the solid titanium compound is dry, having less than about 5 wt % water content, preferably less than about 3 wt % water content, more preferably less than 2 wt %. Preferable solid titanium compounds are those that sublime at a temperature above about 100° C., preferably at a temperature from about 100° C. to about 900° C., preferably above about 150° C., preferably above about 200° C., preferably above about 250° C., preferably above about 300° C., preferably above about 350° C., preferably above about 400° C., preferably above about 450° C., preferably above about 500° C., preferably above about 550° C.

In a preferred embodiment the solid titanium compound is a compound that contains titanium, can vaporize at a temperature below the melt or decomposition temperature of the supported catalyst composition, is reactive with respect to the supported catalyst composition, and does not decompose at a temperature below the melt temperature of the supported catalyst composition. Preferred solid titanium compounds are represented by the formula:

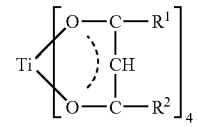

wherein R1 and R2 are the same or different C1-C40 hydrocarbyl groups. In a more preferred embodiment R1 and R2 are the same or different C1-C20 hydrocarbyl group. In an even more preferred embodiment R1 and R2 are the same or different C1-C10 hydrocarbyl group. In a still more preferred embodiment R1 and R2 are the same or different C1-C5 hydrocarbyl group. In an embodiment R1 and R2 are the same or different methyl groups, propyl groups, butyl groups, pentyl groups, and/or hexyl groups. In a preferred embodiment, R1 and R2 are methyl groups. A preferred embodiment of the above described formula includes titanium acetylacetonate [Ti(C5H7O2)4]. Other possible titanium compounds include titanium acetate and titanium methoxide, titanium nitrate, and titanium oxide bis(2,4-pentanedionate)

In another embodiment a solid aluminum compound is used. Preferably the solid aluminum compound is in particulate form. Particle sizes of the solid aluminum compound can range from about 1-10,000 µm, preferably from about 1-500 µm, more preferably the particle sizes range from about 1-250 µm, and even more preferably the particle sizes range from about 1-100 µm. In another embodiment the solid aluminum compound is dry, having less than about 5 wt % water content, preferably less than about 3 wt % water content, more preferably less than 2 wt %. Preferable solid aluminum compounds are those that sublime at a temperature above about 100° C., preferably from about 100° C. to about 900° C., preferably above about 150° C., preferably above about 200° C., preferably above about 250°

C., preferably above about 300° C., preferably above about 350° C., preferably above about 400° C., preferably above about 450° C., preferably above about 500° C., preferably above about 550° C. Preferred solid aluminum compounds are represented by the following formula:

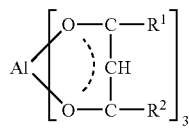

wherein R1 and R2 are the same or different C1-C40 hydrocarbyl groups. In a more preferred embodiment R1 and R2 are the same or different C1-C20 hydrocarbyl group. In an even more preferred embodiment R1 and R2 are the same or different C1-C10 hydrocarbyl group. In a still more preferred embodiment R1 and R2 are the same or different C1-C5 hydrocarbyl group. In an embodiment R1 and R2 are the same or different methyl groups, propyl groups, butyl groups, pentyl groups, and/or hexyl groups. In a preferred embodiment, R1 and R2 are methyl groups. A preferred embodiment of the above described formula includes aluminum acetylacetonate [Al(C5H7O2)3]. Other possible aluminum compounds include aluminum acetate, aluminum nitrate, and aluminum triethoxide.

Supported Catalyst System

The terms "support" or "carrier" are used interchangeably and are any porous or non-porous support material, preferably a porous support material, for example, talc, inorganic oxides and inorganic chlorides, or any other inorganic support material and the like, or mixtures thereof.

A preferred group of carriers include inorganic oxides of Group 2, 3, 4, 5, 13, or 14 metals. Preferred supports comprise silica, alumina, silica-alumina, magnesium chloride, or mixtures thereof. Other useful supports include magnesia, titania, zirconia, and the like. Also, combinations of these support materials may be used, for example, silica-chromium and silica-titania.

In a preferred embodiment the carrier, preferably an inorganic oxide, has a surface area in the range of from about 10 to about 700 m2/g, in another embodiment from about 50 to about 600 m2/g, and in yet another embodiment from about 100 to about 400 m2/g. In another preferred embodiment the carrier, preferably an inorganic oxide, has a total pore volume in the range of from about 0.1 to about 4.0 cc/g, preferably from about 0.5 to about 3.5 cc/g, even more preferably from about 0.8 to about 3.0 cc/g. In an alternative preferred embodiment the carrier, preferably an inorganic oxide, has an average particle size in the range of from about 10 to about 500 μm, preferably from about 20 to about 200 μm, even more preferably from about 20 to about 150 μm. In yet another preferred embodiment the carrier has an average pore size of from about 10 Å to about 1000 Å, preferably about 50 Å to about 500 Å, and most preferably about 75 Å to about 350 Å.

In an embodiment the supported catalyst comprises a metal oxide catalyst compound. Preferably the metal oxide catalyst compound comprises a group 6 metal oxide. More preferably the metal oxide catalyst compound comprises chromium (Cr) oxide or molybdenum (Mo) oxide. In another embodiment the support is impregnated with a Group 6 metal or metal compound from the Periodic Table of the Elements, preferably a Group 6 metal oxide. In another preferred embodiment the support is impregnated with Cr, Mo, or W metal or metal compound. In an alternative preferred embodiment the support is impregnated with Cr or Mo, preferably a Cr oxide or a Mo oxide. In yet another preferred embodiment the support is impregnated with Cr, preferably Cr oxide. In a preferred embodiment the support is chromium impregnated silica. In an embodiment the chromium impregnated silica is HA30W, which can be procured from W.R. Grace & Co-Conn. (Colombia, Md.). HA30W has a pore volume of about 1.5 cc/g, a surface area of about 340 to about 420 m2/g, and contains about 1 percent chromium. In an alternative embodiment the chromium impregnated silica is C-25300, which can be procured from PQ Corporation, Conshohocken, Pa. C-25300 has a pore volume of about 2.2 cc/g, a surface area of about 460 to about 520 m2/g, and contains about 1 percent chromium. Other commercially available support products are 969MPI, HA30, HE-3, HA30LF, and 969MSB, all of which can be procured from W.R. Grace & Co-Conn. (Colombia, Md.). Additionally, EP30XA and EP30X procured from INEOS Silicas Americas LLC Warrington, England (formerly Crosfield Catalysts Ltd.) may be used as the support. EP30XA has 0.25 percent chromium. Specific methods for impregnating a support with a Group 6 metal or metal compound are disclosed in U.S. Pat. No. 2,825,721 and U.S. Pat. No. 3,622,521, which are all herein fully incorporated by reference. In a preferred embodiment, the support has 0.1 wt % to about 2 wt % chromium, preferably 0.25 to 1.5 wt % chromium, preferably 0.5 to 1.0 wt % chromium, as determined by elemental analysis by X-ray photoelectron spectroscopy (XPS) normalizing to hydrogen and metals.

In another embodiment, the support may be impregnated with a Group 6 metal or metal compound from the Periodic Table of the Elements prior to its contact with the solid titanium or solid aluminum compound, during its contact with the solid titanium or solid aluminum compound, or after its contact with solid titanium or solid aluminum compound.

Contacting

The solid titanium or solid aluminum compound and the supported catalyst composition may be contacted either in an activation chamber or premixed in a separate container and then introduced into an activation chamber. An activation chamber is defined to be any container that can contain the solid titanium compound and the supported catalyst composition. Suitable activation chambers include tumblers, drums, mixing tanks, and the like. The solid titanium or solid aluminum compound and the supported catalyst are mixed in the activation chamber at a temperature between about 500° C. to about 20° C., preferably between about 250° C. to about 20° C., most preferably at about 20° C. In an embodiment, the solid titanium or solid aluminum compound and the supported catalyst composition are mixed in a ratio of about 1:1, respectively. In a more preferred embodiment, the solid titanium or solid aluminum compound and the supported catalyst composition are mixed in a ratio of from 1:1 to about 1:5, respectively. In a still more preferred embodiment, the solid titanium or solid aluminum compound and the supported catalyst composition are mixed in a ratio of about 1:1 to about 1:40, respectively. In yet another embodiment, the solid titanium or solid aluminum compound and the supported catalyst composition are mixed in a ratio of about 1:5 to about 1:20, respectively. In an embodiment, the solid titanium or solid aluminum compound and the supported catalyst composition are mixed for a period of between about 16 hours to about 30 seconds, preferably from about 6 hours to about 30 seconds, preferably from about 2 hours to about 30 seconds, preferably from about 1 hour to about 30 seconds.

In a preferred embodiment the solid titanium compound or the solid aluminum compound is contacted with the support in the substantial absence of a solvent. In an embodiment the solid titanium compound or solid aluminum compound is contacted in the presence of solvent, wherein the solvent is present in an amount equal to or less than the total pore volume of the support. In another embodiment the solvent is present in an amount of one to two times the pore volume of the support. In another embodiment the solvent is present in an amount equal to or less than 80 volume % of the total pore volume of the support. In another embodiment the solvent is present in an amount equal to or less than 50 volume % of the total pore volume of the support.

In a preferred embodiment the solid titanium or solid aluminum compound and supported catalyst system are introduced separately into the activation chamber. In this preferred embodiment the components may be added either intermittently or contemporaneously. In a preferred embodiment the components are added one at a time i.e., intermittently. In the intermittent embodiment either the solid titanium or solid aluminum compound, or the supported catalyst composition may be added first; however, in a preferred embodiment the solid titanium or solid aluminum compound is added first. In an embodiment it is preferred to add the supported catalyst composition along with the solid titanium compound to the activation chamber at ambient temperature. In an alternative embodiment the support is added after the activation chamber reaches a temperature sufficient to cause at least 50 wt. % of the solid titanium or solid aluminum compound to vaporize, preferably at least 60 percent of solid titanium or solid aluminum compound is caused to vaporize, more preferably at least 70 percent of solid titanium or solid aluminum compound is caused to vaporize, yet more preferably at least 80 percent of solid titanium or solid aluminum compound is caused to vaporize, still more preferably at least 90 percent of solid titanium or solid aluminum compound is caused to vaporize, even more preferably at least 95 percent of solid titanium or solid aluminum compound is caused to vaporize, most preferably at least 99 percent of solid titanium or solid aluminum compound is caused to vaporize.

Vaporization is the conversion of a substantially liquid substance into a substantially gaseous substance. Sublimation is the direct conversion of a substantially solid substance into a substantially gaseous substance; however, the formation of minor amounts of liquid compound is unavoidable. While not wishing to be bound by the theory, it is believed that the solid titanium or solid aluminum compound undergoes sublimation (or vaporization if it melts and becomes a liquid first) when the mixture is heated. It is further believed that the gaseous titanium compound or gaseous aluminum compound evenly distributes itself over the total surface area (including the pores) of the supported catalyst composition.

By substantially solid it is meant that prior to sublimation or melting less than about 5 mol % of the substance to undergo sublimation or melting is present in the liquid form, preferably less than about 3 mol %, more preferably less than about 1 mol %. By substantially liquid it is meant that prior to vaporization less than about 5 mol % of the substance to undergo vaporization is present in the gaseous or solid forms, preferably that less than about 3 mol % of the substance to undergo vaporization is present in the liquid or gaseous forms, more preferably less than about 1 mol % of the substance to undergo vaporization is present in the liquid or gaseous forms. By substantially gaseous it is meant that following sublimation or vaporization less than about 5 mol % of the substance that underwent sublimation or vaporization is present in the liquid form, preferably that less than about 3 mol % of the substance that underwent sublimation or vaporization is present in the liquid form, more preferably less than about 1 mol % of the substance that underwent sublimation or vaporization is present in the liquid form.

Heating

The amount of heat necessary to cause at least about 50 wt. % of the solid titanium or solid aluminum compound to vaporize will be known to one of skill in the art after minor experimentation in light of the present disclosure. In another embodiment enough heat is provided to cause at least about 55 wt. %, preferably about 60 wt. %, preferably about 65 wt. %, more preferably about 70 wt. %, yet more preferably about 75 wt. %, even more preferably about 80 wt. %, still more preferably about 85 wt. %, yet more preferably about 90 wt. %, more preferably about 95 wt. %, of the solid titanium or solid aluminum compound to vaporize. In an embodiment the metal oxide catalyzed compound is oxidized during the step of heating. While not wishing to be bound by the following theory it is believed that during heating the chromium on the silica is excited into oxidation state three. Alternatively, and while not wishing to be bound by the theory, it is believed that during heating the chromium on the silica is excited into oxidation state six. In an alternative embodiment the metal oxide catalyzed compound is oxidized after the step of heating. It is most preferred to add enough heat to cause about 100 wt. % of the solid titanium or solid aluminum compound to vaporize.

In an embodiment where the solid titanium compound is titanium acetylacetonate about 100 wt. % of the solid titanium compound vaporizes when the activation chamber reaches between about 150° C. and about 900° C., in another embodiment between about 190° C. and about 900° C., in another embodiment between about 200° C. and about 900° C., in another embodiment between about 200° C. and about 850° C., in another embodiment between about 250° C. and about 850° C., in another embodiment between about 300° C. and about 850° C., in another embodiment between about 350° C. and about 850° C., in another embodiment between about 400° C. and about 850° C., in another embodiment between about 450° C. and about 850° C., in another embodiment between about 500° C. and about 850° C., and in another embodiment between about 550° C. and about 850° C. In an embodiment where the solid titanium compound is titanium acetylacetonate at least about 95 wt. % of the solid titanium compound vaporizes when the activation chamber reaches between about 150° C. and about 900° C., in another embodiment between about 190° C. and about 900° C., in another embodiment between about 200° C. and about 900° C., in another embodiment between about 200° C. and about 850° C., in another embodiment between about 250° C. and about 850° C., in another embodiment between about 300° C. and about 850° C., in another embodiment between about 350° C. and about 850° C., in another embodiment between about 400° C. and about 850° C., in another embodiment between about 450° C. and about 850° C., in another embodiment between about 500° C. and about 850° C., and in another embodiment between about 550° C. and about 850° C. In an embodiment where the solid titanium compound is titanium acetylacetonate at least about 90 wt. % of the solid titanium compound vaporizes when the activation chamber reaches between about 150° C. and about 900° C., in another embodiment between about 190°

C. and about 900° C., in another embodiment between about 200° C. and about 900° C., in another embodiment between about 200° C. and about 850° C., in another embodiment between about 250° C. and about 850° C., in another embodiment between about 300° C. and about 850° C., in another embodiment between about 350° C. and about 850° C., in another embodiment between about 400° C. and about 850° C., in another embodiment between about 450° C. and about 850° C., in another embodiment between about 500° C. and about 850° C., in another embodiment between about 550° C. and about 850° C. In an embodiment where the solid titanium compound is titanium acetylacetonate at least about 85 wt. % of the solid titanium compound vaporizes when the activation chamber reaches between about 150° C. and about 900° C., in another embodiment between about 190° C. and about 900° C., in another embodiment between about 200° C. and about 900° C., in another embodiment between about 200° C. and about 850° C., in another embodiment between about 250° C. and about 850° C., in another embodiment between about 300° C. and about 850° C., in another embodiment between about 350° C. and about 850° C., in another embodiment between about 400° C. and about 850° C., in another embodiment between about 450° C. and about 850° C., in another embodiment between about 500° C. and about 850° C., and in another embodiment between about 550° C. and about 850° C. In an embodiment where the solid titanium compound is titanium acetylacetonate at least about 80 wt. % of the solid titanium compound vaporizes when the activation chamber reaches between about 150° C. and about 900° C., in another embodiment between about 190° C. and about 900° C., in another embodiment between about 200° C. and about 900° C., in another embodiment between about 200° C. and about 850° C., in another embodiment between about 250° C. and about 850° C., in another embodiment between about 300° C. and about 850° C., in another embodiment between about 350° C. and about 850° C., in another embodiment between about 400° C. and about 850° C., in another embodiment between about 450° C. and about 850° C., in another embodiment between about 500° C. and about 850° C., and in another embodiment between about 550° C. and about 850° C.

In an embodiment where the solid aluminum compound is aluminum acetylacetonate about, 100 wt. % of the solid aluminum compound vaporizes when the activation chamber reaches between about 150° C. and about 900° C., in another embodiment between about 190° C. and about 900° C., in another embodiment between about 200° C. and about 900° C., in another embodiment between about 200° C. and about 850° C., in another embodiment between about 250° C. and about 850° C., in another embodiment between about 300° C. and about 850° C., in another embodiment between about 350° C. and about 850° C., in another embodiment between about 400° C. and about 850° C., in another embodiment between about 450° C. and about 850° C., in another embodiment between about 500° C. and about 850° C., and in another embodiment between about 550° C. and about 850° C. In an embodiment where the solid aluminum compound is aluminum acetylacetonate at least about 95 wt. % of the solid aluminum compound vaporizes when the activation chamber reaches between about 150° C. and about 900° C., in another embodiment between about 190° C. and about 900° C., in another embodiment between about 200° C. and about 900° C., in another embodiment between about 200° C. and about 850° C., in another embodiment between about 250° C. and about 850° C., in another embodiment between about 300° C. and about 850° C., in another embodiment between about 350° C. and about 850° C., in another embodiment between about 400° C. and about 850° C., in another embodiment between about 450° C. and about 850° C., in another embodiment between about 500° C. and about 850° C., and in another embodiment between about 550° C. and about 850° C. In an embodiment where the solid aluminum compound is aluminum acetylacetonate at least about 90 wt. % of the solid aluminum compound vaporizes when the activation chamber reaches between about 150° C. and about 900° C., in another embodiment between about 190° C. and about 900° C., in another embodiment between about 200° C. and about 900° C., in another embodiment between about 200° C. and about 850° C., in another embodiment between about 250° C. and about 850° C., in another embodiment between about 300° C. and about 850° C., in another embodiment between about 350° C. and about 850° C., in another embodiment between about 400° C. and about 850° C., in another embodiment between about 450° C. and about 850° C., in another embodiment between about 500° C. and about 850° C., and in another embodiment between about 550° C. In an embodiment where the solid aluminum compound is aluminum acetylacetonate at least about 85 wt. % of the solid aluminum compound vaporizes when the activation chamber reaches between about 150° C. and about 900° C., in another embodiment between about 190° C. and about 900° C., in another embodiment between about 200° C. and about 900° C., in another embodiment between about 200° C. and about 850° C., in another embodiment between about 250° C. and about 850° C., in another embodiment between about 300° C. and about 850° C., in another embodiment between about 350° C. and about 850° C., in another embodiment between about 400° C. and about 850° C., in another embodiment between about 450° C. and about 850° C., in another embodiment between about 500° C. and about 850° C., and in another embodiment between about 550° C. and about 850° C. In an embodiment where the solid aluminum compound is aluminum acetylacetonate at least about 80 wt. % of the solid aluminum compound vaporizes when the activation chamber reaches between about 150° C. and about 900° C., in another embodiment between about 190° C. and about 900° C., in another embodiment between about 200° C. and about 900° C., in another embodiment between about 200° C. and about 850° C., in another embodiment between about 250° C. and about 850° C., in another embodiment between about 300° C. and about 850° C., in another embodiment between about 350° C. and about 850° C., in another embodiment between about 400° C. and about 850° C., in another embodiment between about 450° C. and about 850° C., in another embodiment between about 500° C. and about 850° C., and in another embodiment between about 550° C. and about 850° C.

It is preferred that the solid titanium or solid aluminum compound and supported catalyst composition be contacted in a manner such that from about 0.1 wt. % to about 2.5 wt. % of titanium or aluminum, based on the weight of the solid titanium or solid aluminum compound, is present on the supported catalyst composition after the solid titanium or solid aluminum compound has been heated. In another preferred embodiment the solid titanium or solid aluminum compound and support are contacted in a manner such that from about 0.3 wt. % to about 1.0 wt. % of titanium or aluminum is present on the supported catalyst composition after the solid titanium or solid aluminum compound has been heated. In yet another preferred embodiment the solid titanium or solid aluminum compound and supported catalyst composition are contacted in a manner such that from about 0.5 wt. % to about 1.0 wt. % of titanium or aluminum is present on the supported catalyst composition after the solid titanium or solid aluminum compound has been heated.

In an embodiment the combination of the solid titanium compound or solid aluminum compound and the support are heated to a temperature determined by any of the above embodiments and held at that temperature for a time ranging from 16 hours to 30 seconds, preferably 6 hours to 30 seconds.

In one embodiment the catalyst is heated by fluidizing the catalyst in dry air at while heating to a pre-determined temperature. The activated catalyst can be recovered as a free-flowing powder. In an alternative embodiment, the catalyst could be activated with a sequence of gaseous compositions. In one embodiment, the catalyst could be first heated in nitrogen to a certain temperature followed by air at a second temperature, then cooled under nitrogen to ambient temperature. At the end of activation the catalyst could be cooled to ambient temperature and stored under nitrogen for use in a polymerization reactor.

Polymerization Processes

Solid titanium or solid aluminum compounds that have been heated in an manner consistent with the above are suitable for use in a solution, bulk, gas or slurry polymerization process or a combination thereof, preferably solution phase or bulk phase polymerization process.

In one embodiment, this invention is directed toward the solution, bulk, slurry or gas phase polymerization reactions involving the polymerization of one or more of monomers having from 3 to 30 carbon atoms, preferably 3-12 carbon atoms, and more preferably 3 to 8 carbon atoms. Preferred monomers include one or more of propylene, butene-1, pentene-1, 4-methyl-pentene-1, hexene-1, octene-1, decene-1, 3-methyl-pentene-1, and cyclic olefins or a combination thereof. Other monomers can include vinyl monomers, diolefins such as dienes, polyenes, norbornene, norbornadiene, vinyl norbornene, ethylidene norbornene monomers. Preferably a homopolymer or copolymer of propylene is produced. In another embodiment, both a homopolymer of propylene and a copolymer of propylene and one or more of the monomers listed above are produced.

One or more reactors in series or in parallel may be used in the present invention. The solid titanium or solid aluminum compounds that have been heated in an manner consistent with the above may be delivered as a solution or slurry, either separately to the reactor, activated in-line just prior to the reactor, or preactivated and pumped as an activated solution or slurry to the reactor. A preferred operation is two solutions activated in-line. For more information on methods to introduce multiple catalysts into reactors, please see U.S. Pat. No. 6,399,722, and WO0130862A1. While these references may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The solid titanium or solid aluminum compounds that have been heated in an manner consistent with the above can be added to the first reactor in the series. The solid titanium or solid aluminum compounds that have been heated in an manner consistent with the above may also be added to both reactors, with one component being added to first reaction and another component to other reactors.

In one embodiment 500 ppm or less of hydrogen is added to the polymerization, or 400 ppm or less, or 300 ppm or less. In other embodiments at least 50 ppm of hydrogen is added to the polymerization, or 100 ppm or more, or 150 ppm or more.

Gas Phase Polymerization

Generally, in a fluidized gas bed process used for producing polymers, a gaseous stream containing one or more monomers, is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique useful in the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The solid titanium or solid aluminum compounds that have been heated in an manner consistent with the above, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment 500 ppm or less of hydrogen is added, or 400 ppm or less or 300 ppm or less. In other embodiments at least 50 ppm of hydrogen is added, or 100 ppm or more, or 150 ppm or more.)

The reactor is maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process useful in the invention is capable of and the process useful in the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process useful in the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process useful in the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process useful in the invention the concentration of predominant monomer in the reactor liquid medium is in the range of from about 1 to 10 wt. %, preferably from about 2 to about 7 wt. %, more preferably from about 2.5 to about 6 wt. %, most preferably from about 3 to about 6 wt. %.

Another process useful in the invention is where the process, preferably a slurry process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. No. 5,712,352, which are herein fully incorporated by reference.

In another embodiment the process is run with scavengers. Typical scavengers include trimethyl aluminum, tri-isobutyl aluminum and an excess of alumoxane or modified alumoxane.

Homogeneous Bulk, Or Solution Phase Polymerization

The solid titanium or solid aluminum compounds that have been heated in an manner consistent with the above described herein can be used advantageously in homogeneous solution processes. Generally this involves polymerization in a continuous reactor in which the polymer formed and the starting monomer and solid titanium or solid aluminum compounds that have been heated in an manner consistent with the above materials supplied, are agitated to reduce or avoid concentration gradients. Suitable processes operate above the melting point of the polymers at high pressures, from 1 to 3000 bar (10-30,000 MPa), in which the monomer acts as diluent or in solution polymerization using a solvent.

Temperature control in the reactor is obtained by balancing the heat of polymerization with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the solid titanium or solid aluminum compounds used. In general, the reactor temperature preferably can vary between about 30° C. and about 16° C., more preferably from about 90° C. to about 150° C., and most preferably from about 100° C. to about 140° C. Polymerization temperature may vary depending on catalyst choice. For example a diimine Ni catalyst may be used at 40° C., while a metallocene Ti catalyst can be used at 100° C. or more. In series operation, the second reactor temperature is preferably higher than the first reactor temperature. In parallel reactor operation, the temperatures of the two reactors are independent. The pressure can vary from about 1 mm Hg to 2500 bar (25,000 MPa), preferably from 0.1 bar to 1600 bar (1-16,000 MPa), most preferably from 1.0 to 500 bar (10-5000 MPa).

In one embodiment 500 ppm or less of hydrogen is added to the polymerization, or 400 ppm or less or 300 ppm or less. In other embodiments at least 50 ppm of hydrogen is added to the polymerization, or 100 ppm or more, or 150 ppm or more.

Each of these processes may also be employed in single reactor, parallel or series reactor configurations. The liquid processes comprise contacting olefin monomers with the above described system in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

The process can be carried out in a continuous stirred tank reactor, batch reactor or plug flow reactor, or more than one reactor operated in series or parallel. These reactors may have or may not have internal cooling or heating and the monomer feed may or may not be refrigerated. See the general disclosure of U.S. Pat. No. 5,001,205 for general process conditions. See also, international application WO 96/33227 and WO 97/22639. All documents are incorporated by reference for US purposes for description of polymerization processes, metallocene selection and useful scavenging compounds.

EXAMPLES

As indicated below, the examples use HA30W, C-25305, C-25307, and EP30XA. HA30W is a chromium impregnated silica support available from W.R. Grace & Co-Conn. (Colombia, Md.), having a pore volume of about 1.5 cc/g, a surface area of 340-420 m2/g, and containing one percent chromium. C-25305 is a titanated chromium impregnated silica support available from PQ Corp. Conshohocken, Pa., having a pore volume of about 2.2 cc/g, a surface area of 460-540 m2/g, and containing 2.5 percent titanium and one percent chromium. C-25307 is a titanated chromium impregnated silica support available from PQ Corp., having a pore volume of about 2.2 cc/g, a surface area of 460-540 m2/g, and containing 3.5 percent titanium and one percent chromium. EP30XA is a chromium impregnated silica support available from INEOS Silicas Americas LLC Warrington, England (formerly Crosfield Catalysts Ltd.) and contains 0.25 percent chromium. In some examples dibutyl magnesium ("DBM") was added as a co-catalyst. DBM was added in varying amounts according to the atomic ratio of Mg:Cr atomic ratios, as indicated in the examples. Atomic ratios can be calculated for each of the metals based on their respective atomic weight as gram per atom.

Testing Methods

The productivity was measured as grams of polymer per gram of catalyst. The activity was measured as grams of polymer per gram of catalyst-hour. High load melt index (HLMI), expressed as g/10 minutes, was determined according to ASTM D1238-57T, Cond. F (190° C., 21.6 kg). Melt index (MI), expressed as g/10 minutes, was determined according to ASTM D1238-57T, Cond. E (190° C., 2.16 kg); Density, expressed as g/cc, Was determined according to ASTM D 1505-68. Bent strip environmental stress cracking resistance (ESCR), F-50, expressed in hrs, was determined according to D1693 Cond. B, 10% Igepal. Notched Constant Tensile Load (NCTL) in hours is a stress crack resistance test for highway drainage pipe done, as was determined according to AASHTO M294.

Inventive Example 1

In this example, about 10 grams of undehydrated EP30XA was mixed with 0.5 grams of dry titanium acetylacetonate. The mixture was heated to about 816° C. over 5 hours, and held at 816° C. for about six hours. Following the heating, 0.5 wt. % titanium was present on the EP30XA.

Comparative Example 1

In comparative example 1, a catalyst was prepared using a multi-step process. First EP30XA was dehydrated with heat at 230° C. for 6 hours, and transferred to a coating vessel. In the coating vessel an isopentane slurry was formed by adding, under stirred conditions, 30 g isopentane to 10 g EP30XA. Then 2.7 g of titanium isopropoxide per 10 grams of support was added to the slurry such that 4.5 wt. % titanium was present on the EP30XA. The mixture was then dried with heat and a nitrogen purge until it was a free-flowing solid. The free-flowing solid was transferred into a fluid bed activator where it underwent heat activation.

Comparative Example 2

In comparative example 2 a catalyst was prepared using the multi-step process described in comparative example 1. However, in comparative example 20.27 grams of titanium isopropoxide per 10 grams of EP30XA was added to the slurry such that 0.5 wt. % titanium was present on the EP30XA.

Comparative example 1 was run three times. The results of these three runs are presented in Table 1. Comparative example 2 was run three times. Inventive Example 1 was run three times. The results of these runs are presented in Table 1.

TABLE 1

| Examples | Weight % Titanium | Activation (Degrees C.) | Productivity (gPE/g cat.) | Activity (gPE/g cat-hr) | Melt Index |
|---|---|---|---|---|---|
| Inventive Example 1 Run 1 | 0.5 | 816 | 2185 | 2185 | 0.47 |
| Inventive Example 1 Run 2 | 0.5 | 816 | 1531 | 2042 | 0.64 |
| Inventive Example 1 Run 3 | 0.5 | 816 | 1921 | 1921 | 0.75 |
| Comparative 1 Example Run 1 | 4.5 | 825 | 893 | 893 | 0.42 |
| Comparative 1 Example Run 2 | 4.5 | 825 | 980 | 980 | 0.48 |
| Comparative 1 Example Run 3 | 4.5 | 825 | 1082 | 722 | 0.41 |
| Comparative 2 Example Run 1 | 0.5 | 816 | 1926 | 1926 | 0.41 |
| Comparative 2 Example Run 2 | 0.5 | 816 | 1369 | 1826 | 0.53 |
| Comparative 2 Example Run 3 | 0.5 | 816 | 2492 | 2492 | 0.65 |

Catalyst Activation

Eight catalysts were prepared by dry mixing Titanium(IV) acetylacetonate (Registry Number 17501-79-0, from City Chemical LLC) with commercial HA30W catalyst in a 50 cc serum capped bottle. The catalyst was placed in a cylindrical tube and fluidized in dry air at 2 feed per minute linear velocity while being heated to a predetermined temperature, anywhere from 480° C. to 820° C., and held at the predetermined temperature for six hours. The activated catalyst was recovered as a free-flowing powder. Once activated, the catalyst was cooled to ambient temperature and stored under nitrogen for later use in polymerization. The titanium wt. % in the activated catalyst was determined by material balance. The material balance was calculated assuming that the organic portion would be volatilized and the titanium would remain behind.

TABLE II

| Catalyst | Ti wt % in the activated Catalyst | Ti(acac)$_4$ grams | HA30W (grams) |
|---|---|---|---|
| A | 0.2 | 0.18 | 10.0 |
| B | 0.3 | 0.28 | 10.0 |
| C | 0.55 | 0.53 | 10.3 |
| D | 0.6 | 0.56 | 10.0 |
| E | 0.87 | 0.82 | 10.2 |
| F | 1.0 | 0.93 | 10.0 |
| G | 1.5 | 1.40 | 10.0 |
| H | 2.5 | 2.30 | 10.0 |

Examples 2-35, in Table III and Table IV, show polymerization data of Catalysts B-H of Table II, and additionally show polymerization data of the following comparative catalysts: C-25307 and HA30W having zero titanium in the activated catalyst. Examples 22-24 were performed in the same manner as the first example, except C-25307 was used instead of EP30XA. Examples 34 and 35 were performed in the same manner as the first example, except HA30W was used instead of EP30XA. Examples 2-35 show properties of polymerized ethylene and hexene copolymer, as indicated below. The polymerizations were conducted in a six-liter autoclave equipped with a mechanical overhead stirrer and an external jacket for regulating temperature. The polymerization was performed by providing the continuous addition of ethylene at a fixed total pressure. The reactor had thermocouples to control the temperature of the external jacket and the internal temperature of the reactor during the polymerization. The reactor temperature of Examples 2-21 is listed in Table III. The reactor temperature of Examples 22-35 was 107° C. Ethylene fed to the reactor was passed through an electronic gas flow meter to permit continues monitoring of the ethylene flow to the reactor. All handling of the polymerization reaction components was carried out using airless techniques to exclude oxygen and water. The polymerization was conducted in isobutane slurry that had been dried and deoxygenated. All runs were conducted at 460 to 500 psig (3.45 MPa) reactor pressure. Co-polymers of ethylene and hexene-1 were made in some cases. Upon completion of the polymerization test run (normally 45 to 60 minutes) the reactor was vented to the atmosphere to remove isobutane and unreacted ethylene. The remaining particle form polymer was dried with a nitrogen gas flow at 70° C. for 20 minutes. Finally the reactor was cooled and the dry polyethylene powder recovered.

Tables III and IV show that the inventive catalysts, which have a lower titanium wt. %, have a higher activity than comparative examples 22-24, with the exception of example 20, which applicants believe is normal variability. Tables III the reactive temperature conditions vary from 103° C. to 107° C. and the activation temperature varies from 593° C. to 732° C., so Table III does not make a fair comparison to examples 34 and 35. Table IV is at equal polymerization conditions and shows that the inventive catalysts C, E, and F average a higher melt index and a higher high load melt index over comparative examples 34 and 35.

All documents described herein are incorporated by reference herein, including any priority documents and/or testing procedures. As is apparent from the foregoing gen-

TABLE III

| Catalyst | Ex. | Mg/Cr | Catalyst Activ (° C.) | Reactor Temperature (° C.) During Polymerization | Activity* | MI (dg/min) | HLMI (dg/min) | Density (g/cc) |
|---|---|---|---|---|---|---|---|---|
| B | 2  | 5.3  | 732 | 107 | 4843 | 0.66 | 38   | 0.9453 (1) |
| B | 3  | 5.3  | 732 | 107 | 4520 | 0.54 | 35.5 | 0.9459 (1) |
| B | 4  | 4.0  | 732 | 107 | 4126 | 0.14 | 14.5 | 0.9526 (2) |
| B | 5  | 4.7  | 732 | 105 | 4091 | 0.29 | 21.1 | 0.9469 (1) |
| B | 6  | 4.6  | 732 | 105 | 3864 | 0.23 | 19.1 | 0.9481 (1) |
| B | 7  | 3.5  | 732 | 105 | 4025 | 0.23 | 18.7 | 0.9488 (2) |
| B | 8  | 3.4  | 732 | 105 | 3610 | 0.19 | 16.5 | 0.9499 (2) |
| B | 9  | 3.5  | 732 | 105 | 3544 | 0.23 | 17.9 | 0.9523 (2) |
| B | 10 | 3.4  | 732 | 103 | 2837 | 0.11 | 10.6 | 0.9511 (2) |
| B | 11 | 3.4  | 732 | 103 | 3227 | 0.12 | 12.5 | 0.9505 (2) |
| B | 12 | 3.3  | 732 | 103 | 3139 | 0.14 | 12.7 | 0.9517 (2) |
| D | 13 | 5.6  | 732 | 107 | 3650 | 0.23 | 19.3 | 0.9424 (1) |
| D | 14 | 5.4  | 732 | 107 | 3722 | 0.67 | 44.9 | 0.9462 (1) |
| D | 15 | 4.3  | 732 | 107 | 3629 | 0.16 | 15   | 0.9515 (2) |
| G | 16 | 4.5  | 593 | 107 | 3536 | 0.04 | 5.0  | 0.9529 (1) |
| G | 17 | 4.5  | 593 | 107 | 3047 | 0.07 | 7.1  | 0.9505 (1) |
| G | 18 | 4.5  | 593 | 107 | 2968 | 0.04 | 5.3  | 0.9507 (1) |
| G | 19 | 2.25 | 593 | 107 | 3239 | 0.04 | 5.2  | 0.9538 (4) |
| H | 20 | 4.5  | 593 | 107 | 2383 | 0.08 | 8.3  | 0.9555 (3) |
| H | 21 | 4.5  | 593 | 107 | 3328 | 0.10 | 9.2  | 0.9547 (3) |

*Activity units are grams PE made per gram catalyst per hour
2 cc hexene added
1.5 cc hexene added
no hexene
1 cc hexene added

TABLE IV

| Catalyst | Ex. | Mg/Cr | Wt % Ti | Activ Temp (° C.) | Activity* | MI (dg/min) | HLMI (dg/min) | Density (g/cc) | NCTL (hrs) |
|---|---|---|---|---|---|---|---|---|---|
| C-25307 | 22 | 2.3 | 3.5  | 649 | 2486 | 0.40 | 36.1 | 0.9566 (3) | 13.8 |
| C-25307 | 23 | 2.3 | 3.5  | 649 | 2435 | 0.70 | 39.8 | 0.9560 (3) | 12.9 |
| C-25307 | 24 | 2.3 | 3.5  | 649 | 2636 | 0.71 | 40.7 | 0.9548 (3) | 14.2 |
| C       | 25 | 2.3 | 0.55 | 704 | 4966 | 0.43 | 27.3 | 0.9492 (3) | 32.1 |
| C       | 26 | 2.3 | 0.55 | 704 | 4628 | 0.18 | 14.1 | 0.9524 (3) | 40.9 |
| C       | 27 | 2.3 | 0.55 | 704 | 4124 | 0.30 | 20.6 | 0.9510 (3) | 37.5 |
| E       | 28 | 2.3 | 0.87 | 704 | 4536 | 0.43 | 31.2 | 0.9539 (3) | 16.3 |
| E       | 29 | 2.3 | 0.87 | 704 | 4750 | 0.12 | 23.9 | 0.9527 (3) | 22.2 |
| E       | 30 | 2.3 | 0.87 | 704 | 3716 | 0.61 | 37.9 | 0.9518 (3) | 16.7 |
| F       | 31 | 4.5 | 1.0  | 704 | 4727 | 0.22 | 17.2 | 0.9496 (1) | 43.9 |
| F       | 32 | 4.5 | 1.0  | 704 | 4969 | 0.30 | 21.7 | 0.9475 (1) | 44.4 |
| F       | 33 | 3.4 | 1.0  | 704 | 4030 | 0.23 | 20   | 0.9491 (2) | 37.9 |
| HA30W   | 34 | 0   | 0    | 704 | 4750 | 0.26 | 19.9 | 0.9474 (1) |      |
| HA30W   | 35 | 0   | 0    | 704 | 4149 | 0.22 | 18.8 | 0.9473 (1) |      |

*Activity units are grams PE made per gram catalyst per hour
2 cc hexene added
1.5 cc hexene added
1.0 cc hexene added eral description and preferred embodiments, while forms of the invention have been illustrated and described, various modifications can be made without departing from the spirit and scope of the invention. Accordingly, it is not intended that the invention be limited to the specific embodiments described in this application.

The invention claimed is:

1. A method to polymerize olefins comprising:
contacting a solid titanium compound with a dry support, heating the solid titanium compound to cause at least 50 wt. % of the solid titanium compound titanium compound to sublime, and activating the support by oxidation, thereafter contacting the activated support with one or more olefin monomers, wherein the solid titanium compound is represented by the formula:

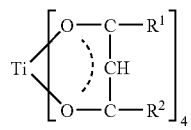

where $R_1$ and $R_2$ are the same or different $C_1$-$C_{40}$ hydrocarbyl groups and wherein the combination of the solid titanium compound and the support is heated to a temperature of at least 150° C.

2. The method of claim 1 wherein the olefin comprises ethylene.

3. The method of claim 1 wherein the olefin comprises propylene.

4. The method of claim 1 wherein the polymerization occurs in the gas phase.

5. The method of claim 1 wherein the polymerization occurs in the slurry phase.

6. The method of claim 1 wherein the polymerization occurs in the bulk phase.

7. The method of claim 1 wherein the support comprises chromium impregnated silica.

8. The method of claim 1 wherein the solid titanium compound is titanium acetylacetonate.

9. The method of claim 1 where at least 0.1 wt. % of titanium is present on the support.

10. The method of claim 1 wherein the solid titanium compound and support are contacted in the presence of solvent, wherein the solvent is present in an amount less than the total pore volume of the support.

11. A method to polymerize olefins comprising:
contacting a solid titanium compound with a dry supported catalyst compound, heating the solid titanium compound to cause at least 50 wt. % of the solid titanium compound to sublime, and activating the supported catalyst compound by oxidation, thereafter contacting the activated supported catalyst compound with one or more olefin monomers,
wherein the solid titanium compound is represented by the formula:

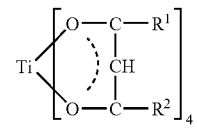

where $R_1$ and $R_2$ are the same or different $C_1$-$C_{40}$ hydrocarbyl groups and wherein the combination of the solid titanium compound and the support is heated to a temperature of at least 150° C.

12. The method of claim 11 wherein the olefin comprises ethylene.

13. The method of claim 11 wherein the olefin comprises propylene.

14. The method of claim 11 wherein the supported catalyst compound comprises a metal oxide catalyst compound.

15. The method of claim 14 wherein the metal oxide catalyst compound, comprises a group 6 metal oxide.

16. The method of claim 14 wherein the metal oxide catalyst compound comprises a Cr oxide.

17. The method of claim 11 wherein the supported catalyst compound comprises chromium impregnated silica.

18. The method of claim 11 wherein the polymerization occurs in the gas phase.

19. The method of claim 11 wherein the polymerization occurs in the slurry phase.

20. The method of claim 11 wherein the polymerization occurs in the bulk phase.

21. The method of claim 11 wherein the solid titanium compound is titanium acetylacetonate.

22. The method of claim 11 where at least 0.1 wt. % of titanium is present on the support.

23. The method of claim 11 wherein the solid titanium compound and support are contacted in the presence of solvent, wherein the solvent is present in an amount less than the total pore volume of the support.

* * * * *